Oct. 12, 1965 A. L. FREEDMAN 3,212,060

DIGITAL PROCESSING SYSTEMS

Filed July 28, 1960

United States Patent Office 3,212,060

Patented Oct. 12, 1965

3,212,060

DIGITAL PROCESSING SYSTEMS

Arye Leib Freedman, London, England, assignor to Decca Limited, a British company Filed July 28, 1960, Ser. No. 46,003
Claims priority, application Great Britain, July 30, 1959, 26,251/59
3 Claims. (Cl. 340—172.5)

This invention relates to data processing systems containing a number of units capable of storing and/or processing information. For example, in a data processing system there may be provided not only computing units but also storage units such as magnetic tape units and also various data input and output devices for feeding information into or taking information out of the computing system, e.g., punched tape units, magnetic tape units, punched card units, analogue to digital converters, digital to analogue converters or other data handling means.

The ancillary storage and input and output units may have their operations initiated by a computer unit but they may deliver data to or demand data from the computer unit at times independent of the data handling rate of the computer unit. One method that has been employed to deal with these ancillary units is to provide buffer stores between the ancillary units and the computer unit. To feed information from the computer unit to an ancillary this information would be first deposited in a buffer store under the control of the computer. The latter would then initiate the operation of the ancillary which extracts the information from the buffer store at a time to suit itself without in any way interfering with the operation of the central computer unit. The buffer stores thus relieve the computer from coping with the problem of timing. Such separate buffer stores each including its own control unit, however, require much equipment and so greatly increase the expense of the whole data processing apparatus. The amount of storage required in the buffers might be decreased at the expense of more frequent interruption of the programme in the computer unit but the amount of equipment required is still large because only the amount of storage and not the other equipment in the buffers is reduced. To avoid the use of such buffers it has been proposed to employ what is known as "programmed time-sharing." In such an arrangement, whenever an ancillary has data for a central computer unit or else requires data from a computer unit, the latter is made to interrupt the programme which it is currently performing, note the point at which it has been interrupted and go into a short programme which either stores the information delivered by the ancillary or else supplies the required information from the computer store. When this is completed the computer then resumes its previously interrupted programme. Such an arrangement, however, requires a very fast computer but, even with the fastest computers at present in operational use, the time required for feeding data to or taking it from an ancillary unit can readily be a very substantial proportion of the total time otherwise available for computing bearing in mind the number of operations that the computer would have to perform. Even in the case of a relatively simple ancillary it might be necessary, for example, to perform the following operations:

(1) Store the sequence control number (2) Jump to programme appropriate to the calling ancillary unit (3) Feed the input information to or the output information from the storage location (4) Decrease the address number to be ready for the next item of information (5) Restore the sequence control number.

In the case of a magnetic tape it may be necessary not only to store away data from the tape but also to accumulate an end-of-block check sum which would require the further operations of (6) Dump accumulator (7) Add accumulator to a specified storage location for which instruction requires time for addition and for restoring to the accumulator.

Core stores at present in operational use in computers have a cycle time of about 6 microseconds and it would thus in general take at least about 44 microseconds and perhaps longer to store away data from the tape. A magnetic tape deck with a one inch wide tape running at 200 inches per second and with a packing density of 300 bits to the linear inch would give 48 bit words every 67 microseconds. If words with smaller numbers of bits were employed, the words would be available even more frequently. It will thus be seen that programmed time-sharing systems such as have been suggested heretofore, with present day computer speeds and magnetic tape speeds, cannot possibly make the fullest use of information that might be available from a number of magnetic tape units and it is well-known that, if a number of magnetic tape units are employed, their performance generally has to be de-rated to limit the input data sufficiently that the computer is able to deal with all the inputs. Similar problems arise with other types of ancillary input and output and storage units in that the provision of input information or the display of output information or the transfer to or from a storage unit would take more time than is available if the input and output data were to be utilised as fully as possible.

According to this invention, in a data processing system containing a number of units capable of storing and/or processing information, means are provided enabling each of a number of units to feed instructions into the instruction register of one or more other units. Each unit may be provided with an instruction register which, on receipt of an instruction, initiates the carrying out of an operation according to the instruction and this arrangement makes it very easy to allocate parts of the work to be done between the various units, to interchange information between them and to place the facilities contained in one unit at the disposal of another unit. In practice, it is generally found that most of the equipment necessary for the instruction registers is already present in the various units and thus very little additional equipment is necessary, compared with known types of data processing equipment, as will be apparent from the specific examples discussed below. Considering, for example, computing apparatus with a computer unit for carrying out arithmetical operations and one or more magnetic tape units as storage devices, it may be required that, as a result of computation effected by the computer unit, the tape unit has to carry out a certain task. In such a case the computer would feed the necessary instruction in the form of function digits and address digits to the instruction register of the tape unit which would, on receipt of this instruction, initiate the necessary operation of the tape unit. As another example it may be required that certain data should be read from the magnetic tape in a tape unit and arithmetical operations carried out on it by a computer unit and the results subsequently stored. In such a case the magnetic tape unit would feed the appropriate instruction digits into the instruction register of the computer unit which would cause the latter to transfer the necessary information from the tape unit to its arithmetical operating facilities, then to process the information as required and subsequently to put the result in a store.

By feeding the necessary instruction directly into the computer unit when the data from the ancillary unit is to be fed to the computer unit or to be extracted from the computer unit, the interruption of the computer unit programme may in general be only for a single operation with a consequential enormous time saving compared with the many operations in the programmed time-sharing systems heretofore proposed. In previous types of programmed time-sharing, all the ancillaries, on calling, cause the computer to carry out four operations, viz. firstly store the required control number and possibly other information pertaining to the interrupted programme (e.g., the contents of an accumulator or accumulators), to prevent this information being interfered with by the interrupting programme, secondly extract the instruction or instructions which have to be performed for the particular ancillary unit, thirdly carry out this instruction or instructions and fourthly restore the information pertaining to the interrupted programme. Only the third of these operations does any useful work and, in the present invention, the other three are eliminated by making the ancillary directly cause the computer to obey the required instruction. There is thus a very much quicker operation without any need for buffer stores with their separate ancillary control units in that all the various arithmetical operations and processing are carried out in the central computer unit.

Since instructions are not extracted from a store, the sequence control number is not used by the interruptions from ancillary units. Therefore, there is no need to store it away in order to preserve it for future use. Also it is normally not necessary to store the contents of the accumulator or accumulators as the instructions inserted by the ancillary units can usually be performed using other registers in the computer unit and so not disturbing the contents of the accumulator or accumulators.

In one arrangement of data processing system according to the invention, the system includes a digital computer unit with a fast access store and a number of ancillary data storage and/or input and/or output units, the ancillary units operating independently of the computer unit digital rate, wherein each of the ancillary units has an instruction register to provide the necessary instructions for the computer unit to enable the computer unit to accept information directly from and/or to feed information directly to the ancillary unit without having to obtain a further programmed instruction from a programme store and wherein there is provided a system control unit arranged to operate gates controlling the passage of instructions from each ancillary unit to the computer unit and gates controlling the passage of the data fed to computer unit from the ancillary units and from the computer unit to the ancillary units.

The following is a description of one embodiment of the invention, reference being made to the accompanying drawings in which.

Figure 1:
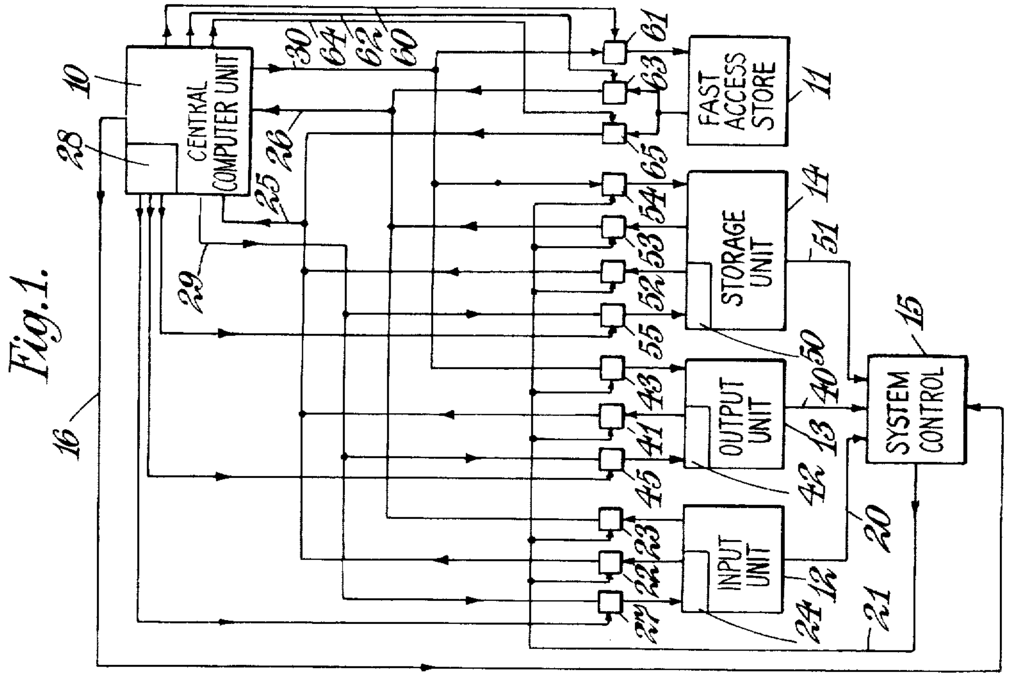
FIGURE 1 is a block diagram illustrating a digital data processing system.

Referring to FIGURE 1, there is shown a central computer unit 10 which receives information from or feeds information to a number of ancillary units and which also makes use of a fast access store 11. For simplicity in the drawing there are shown three typical ancillary units, namely, a unit 12 which provides only for feeding data into the computer unit 10, a unit 13 which is an output unit for displaying or transmitting data from the computer unit and a storage unit 14 which may receive data from and feed data into the computer unit. It will be understood that there may be a large number of such ancillary units of the same or different types. The data input unit 12 might, for example, be a punched tape reader or analogue-to-digital converter or the receiving end of a data transmission link. The output unit 13 might be a display device or an indicator or a punched tape output unit or the transmitting end of a data transmission link. The storage unit 14 might be a magnetic tape unit or a magnetic drum system or a punched tape unit or other data storage system. The ancillary units would generally have a data rate much slower than the data rate of the computer unit and the various ancillary units will operate at times independently of the computer data rate and generally independently of one another. There is provided a system control unit 15 including priority control means which determine which of the ancillary units should have access to the computing unit if two or more ancillary units should call at the same time. To avoid the destruction of essential information in the computer unit, a programme may only be interrupted at certain points, referred to as interruption points, within or between instructions. The system control unit must therefore not connect an ancillary to the computer unit unless the latter is available for use. There is therefore provided a control circuit 16 from the computer unit 10 to the system control unit 15 to inform the latter when an interruption point occurs.

Considering firstly the data input unit 12, when this unit has data to put into the computer unit a signal is sent via a circuit 20 to the system control unit 15 and, if no other ancillary unit has priority at the next interruption point, the system control unit, by means of a gate-operating circuit 21 opens simultaneously two gates 22, 23. The gate 22 permits the passage of an instruction from an instruction register 24 in the data input unit 12 directly via an instruction input circuit 25 into the computer unit 10. The instruction register 24 is arranged to give the specific instruction required for dealing with the data to be fed from the unit 12. This data is passed through the gate 23 via a data input lead 26 into the computer 10. As an example, the information sent to the computer might comprise say six digits which have to be combined with previous information for building up a word and the instruction might be that the data is to be combined with data read out from a specific location in a store and left shift applied and the combined data rewritten into the store. Such an operation may be performed in one store cycle by an appropriate specific instruction fed into the computer 10. Some data input systems can only operate in one mode, that is to say, if there is input information, this will be dealt with always according to one instruction by the computer unit, and the data input unit would have no other mode of operation. In such a case the instruction register 24 may merely comprise a translation matrix to provide the required instruction. Such a translation matrix, although inherently associated with a particular ancillary unit, may be more conveniently located in the system control unit 15. It will be appreciated that the actual location of the instruction register would not affect the manner of operation of the system. In the drawing, however, it is assumed that the data input unit is capable of two or more modes of operation, each having a particular instruction set up in the instruction register 24. In that case it may be necessary for the computer unit 10 to feed an appropriate instruction into the instruction register 24 and for this purpose there is a further gate 27 controlled by an ancillary address decoder 28 in the computer unit so that the decoder 28, on receipt of the appropriate address, opens the gate 27 to permit an instruction to pass from the computer unit 10, via an instruction output circuit 29, to the instruction register 24 in the ancillary unit 12. The setting up of the instruction in the register 24 is arranged to condition the ancillary unit to the appropriate required mode of operation. A unit having two or more modes of operation would generally have bi-stable circuits or other two-state devices controlling the operation of the unit. The setting of these two-state devices would correspond to the mode of operation and these devices may conveniently be arranged to constitute the instruction register 24. The computer unit 10 is arranged to accept this setting as the appropriate instruction to the computer unit for dealing with the information from the ancillary unit 12.

The computer unit 10 will have an accumulator or accumulators which are under the control of the programmer in the sense that the programmer can write a programme including steps of transferring information to or from the accumulator or accumulators. The computer unit 10 will also have other fast access registers which are not under the control of the programmer in this way but which may be required for carrying out operations on data, for example, a multiplication operation will require at least one more register in addition to that in which the final total is accumulated. The data from the ancillary unit 12 is passed directly to such a further register without using either an accumulator register or a sequence control register storing the sequence number of the programme in operation in the computer unit 10. This can be done at one of the interruption points and thus the data can be passed into the computer unit 10 without interfering with the programme already being carried out and without requiring either the information in the accumulator or accumulators or the sequence control number to be passed into a store. Thus for most purposes, the ancillary unit 12 only requires the computer unit for one data storage cycle for each item of information to be transferred.

Similarly in a data output unit such as the unit 13, when it is required to extract information from the computer unit 10 for this output unit 13, the latter calls the system control unit 15 via a lead 40 and, assuming that the priority control has not given priority to any other ancillary unit, the system control unit 15 via circuit 21 opens at the next interruption point a gate 41 to permit the passage of an instruction from the instruction register 42 in the ancillary unit 13 via circuit 25 to the computer unit 10 and also opens a gate 43 to permit the passage of data from the computer unit 10 via circuit 30 into the unit 13. If the ancillary unit 13 has only a single mode of operation, the instruction register 42 may be a translation matrix and may be located in the system control unit 15, as described for the ancillary unit 12. In the drawing, it is assumed that the ancillary unit 13 has two or more possible modes of operation and a gate 44 is therefore provided controlled by the ancillary address decoder 28 for connecting the instruction input circuit 29 to the unit 13 so that the unit 13 accepts the necessary instruction from the computer unit 10 and then operates as previously described. The unit 13, like the unit 12, operates without employing the accumulator or accumulators or the sequence control register in the computer unit 10 to minimize the computer time required.

In FIGURE 1 the data output circuit 30 from the computer is shown separately from the instruction output circuit 29. A common circuit might however be employed, the various ancillary units being fed through the appropriate gates so that signals on this circuit are treated as information or instructions appropriately in accordance with the opening of the various gates.

The storage unit 14 might typically be a magnetic tape storage unit. In such a case the unit would have several possible modes of operation, e.g., writing, reading, rewinding etc. Such a unit would, in general, have a number of control bi-stable circuits as, for example, in the unit described in the specification of British Patent No. 833,549. This means that any given operational setting of the tape unit is uniquely defined by a particular setting of the control bi-stable circuits. These bi-stable circuits can be arranged to consitute the necessary instruction register. The computer unit may be so designed that when the states of these bi-stable circuits are set up in the instruction register of the computer unit, the latter will carry out just those operations which are required by the particular operational state of the tape unit at the given moment. If one assumes as an example that a given operational state on a tape unit demands that information from the tape be read off and compared with information in specified storage locations of the computer unit the states of the bi-stable circuits on the tape unit at that moment when set up in the instruction register of the computer will cause the latter to transfer the information from the tape to an arithmetic unit in the computer, read out the information from that storage location in its own store which is indicated by the address digits of the instruction register on the tape unit and then also possibly add one to the aforesaid address digits and insert the augmented address back into the instruction register of the tape unit so causing the following comparison to be made with the contents of a further location.

In the unit 14, the bi-stables representing the operational state of the unit and hence forming, in effect, an instruction register are represented diagrammatically at 50. If the ancillary storage unit 14 is required to feed information into the computer and it is conditioned for this operation, the register 50 will be set up to give the desired mode of operation and this particular setting of the control elements in the register, when inserted into the central computer unit instruction register, will be interpreted by the latter as the instruction required for dealing with the information from this ancillary unit 14. The unit 14 calls the system control unit 15 via a circuit 51 and, assuming that there is no other ancillary unit with priority, the system control unit 15 opens two gates 52, 53 to permit the passage of instructions and data respectively into the computer unit 10. Similarly if information is to be fed into the anacillary storage unit 14, the gate 52 will be opened to send the necessary instruction to the computer unit 10 and a gate 54 will be open to pass the data from the computer unit 10 to the ancillary storage unit 14. Since a storage unit must inherently be capable of at least two modes of operation, namely, reading and writing, and may be capable of further modes such as, in the case of a magnetic tape unit, moving backwards or forwards or writing block marks, provision is made for the computer unit 10 to feed instructions into the instruction register 50. For this purpose, there is provided a gate 55 controlled by an output from the ancillary address decoder 28, which gate controls the feeding of instructions from the instruction output circuit 29 of the computer unit to the register 50.

It will be seen that if the ancillary unit 14 is ready to feed information into the computer unit 10, the call from the unit 14 will transfer the instruction contained in the instruction register 50 to the computer unit. This instruction would typically be to transfer the word from the unit 14 to a storage location given by a running address which is kept in a working location allocated to the particular ancillary unit 14 and to increase the running address by one. It may also complete a running total for checking purposes which would be kept in another working location.

The word transferred from the unit 14 to the computer unit 10 will be passed to a register other than the accumulator or accumulators or the sequence control register to avoid having to store the contents of these registers and subsequently to restore them to the appropriate register. In the case of a tape unit, it may be required, for example, to accumulate an end-of-block check sum and to increase a running address by one for each item of information and to effect a comparison. If these three operations are to be performed as quickly as possible, it is necessary to reduce as far as possible the number of store accesses required. For this purpose, it may be convenient to provide further fast access registers.

Figure 2:
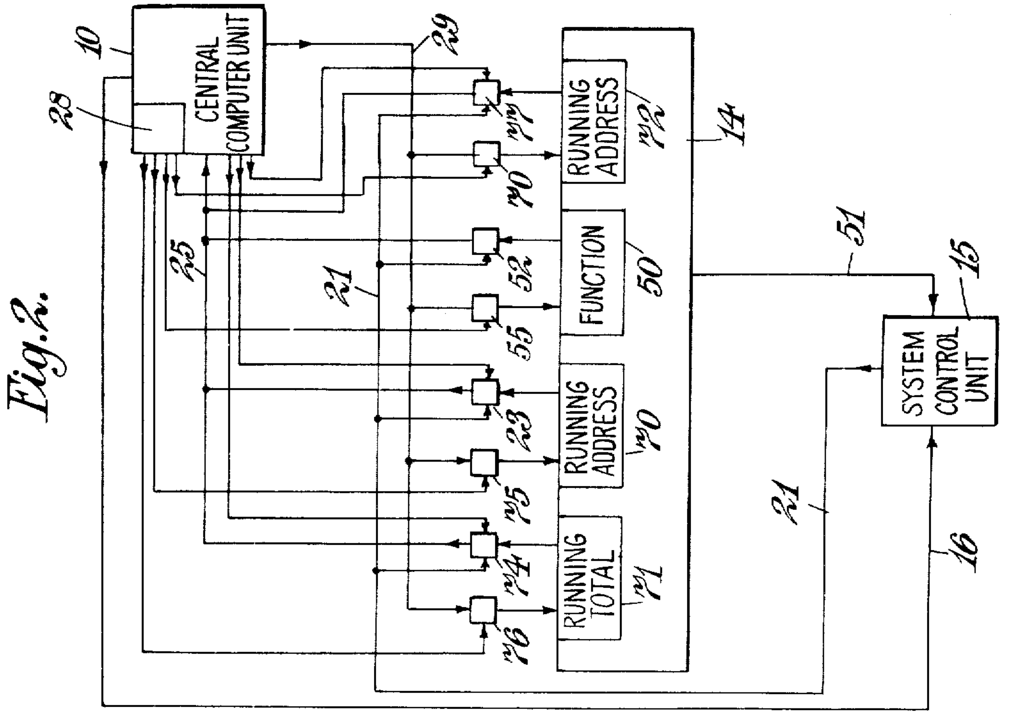
FIGURE 2 is a diagram illustrating a modification of the system of FIGURE 1.

FIGURE 2 illustrates a modification of the data processing system of FIGURE 1 in which the ancillary unit 14 is provided with further fast access storage for working simultaneously with the fast store in the computer unit 10. In FIGURE 2, there are shown only the central computer unit 10, the ancillary unit 14 and the system control unit 15 and their interconnecting circuits. It is to be understood that further ancillary units and a fast access store would be provided as in FIGURE 1. The unit 14 in FIGURE 2 is provided with three further quick access registers 70, 71 and 72 in addition to the instruction register 50. The register 70 may be used, for example, as a running address register showing where information is to be stored whilst the register 71 may be used as a running total register. The register 72 may be used to maintain the running address of information which is to be used for comparison purposes. The comparison is effected in the computer unit 10. The information in the registers 70, 71, 72 will have to be fed to the computer unit at some time during the execution of the instruction inserted by the ancillary and for this purpose the registers 70, 71, 72 are coupled to the data input circuit 25 of the computer unit 10 by gates 73, 74, 77, respectively, controlling the passage of the informaiton from these registers into the data input circuit 25. Each of these gates 73, 74, 77, is controlled by both the system control unit 15 and by the computer unit 10 so as to open only to pass information when the appropriate control signals are received, so that the information is only passed to the computer unit 10 when required. The registers 70, 71, 72 may have to be controlled by the computer, for example for re-setting and, for this purpose signals can be put into these registers from the instruction output circuit 29 or from the data output circuit 30, which, as previously explained may be a common circuit; input gates 75, 76, 78, respectively, enable the input of information into these registers to be controlled by the address decoder 28 of the computer unit 10. By providing the further registers 70, 71, 72 as shown in FIGURE 2 a running total of the words on the tape may be kept in the running total register 71, the running address increased and returned to the register 70, the new word placed in the store 11, the running address for comparison increased and returned to the register 72, the word for comparison extracted from the store 11 and the comparison effected in the computer unit all in two store cycles. It will be seen that the period of interruption of the programme being carried out by the computer unit, when the ancillary unit 14 has information to be read out, is kept to the minimum period of two store cycles dictated by the fact that the information from the tape has to be placed in, and the information for comparison extracted from, the fast store 11. The speed of this operation is thus limited only by the time to use the store in the computer unit 10.

Referring again to FIGURE 1, as previously mentioned, the data processing system shown has a fast access store 11 which may be arranged in known manner. An instruction to write in the store 11 is fed from the computer unit 10 over circuit 60 to open a gate 61 to permit data from the data output circuit 30 to be written into the store. An instruction to read from the store 11 is fed from the computer unit 10 over either circuit 62 to open gate 63 or over circuit 64 to open gate 65 according as to whether the information to be sent from the store 11 is data for processing to be fed to circuit 26 or an instruction to be performed which is fed to circuit 25.

There has been described a data processing system in which there are no buffers or control units between the various ancillaries and the computer unit. Each ancillary sends specific instructions to the computer unit so that, when an ancillary unit requires attention, the necessary information is given or extracted in the minimum time.

I claim:

1. A data processing system comprising (a) a central computer and (b) a plurality of ancillary units each operable to receive information from or to feed information to the central computer, (c) the computer having a control unit arranged on receipt of an instruction to control the operation of the computer in accordance with the instruction and having a programme store for providing programme instructions to the control unit during normal operation of the central computer, and (d) at least one ancillary unit having an instruction register and means to feed the instructions from said instruction register to the control unit of said central computer to control the computer to operate in accordance with the requirements of the ancillary unit without having to obtain any instruction from the programme store.

2. A data processing system as claimed in claim 1 wherein at least one of said ancillary units is a data input unit providing digital data and wherein the instruction register in that ancillary unit is arranged, when data is to be fed from the data input unit to the central computer, to provide the necessary instruction to the control unit of the central computer to enable the central computer to accept information directly from the data input unit without having to obtain a further programmed instruction from the programme store.

3. A data processing system as claimed in claim 1

(a) wherein at least one of said ancillary units is a data output unit requiring data from the computer and (b) wherein the instruction register in that ancillary unit is arranged, when data is to be fed to the data output unit from the central computer, to pass the necessary instruction to the control unit of the central computer to enable the computer unit to pass the required information directly to the data output unit without having to obtain a further programmed instruction from the programme store.

References Cited by the Examiner

UNITED STATES PATENTS

| | | | |
|---|---|---|---|
| 2,995,729 | 8/61 | Steele | 340—172.5 |
| 3,029,414 | 4/62 | Schrimpf | 340—172.5 |
| 3,061,192 | 10/62 | Terzian | 235—157 |
| 3,117,306 | 1/64 | Reitfort | 340—172.5 |
| 3,133,268 | 5/64 | Avakian et al. | 340—152 |

ROBERT C. BAILEY, *Primary Examiner.*

IRVING L. SRAGOW, MALCOLM A. MORRISON, *Examiners.*